United States Patent Office 2,798,017
Patented July 2, 1957

2,798,017
COATING COMPOSITION FOR METALS

David K. Lesser, Wilmington, Del., assignor to Hercules Powder Company, Wilmington, Del., a corporation of Delaware No Drawing. Application June 7, 1954,
Serial No. 435,083

1 Claim. (Cl. 148—6.16)

This invention relates to a coating composition for metals and more particularly to a coating composition which has improved adhesion to metals, the ability to inhibit the corrosion of metals and wherein a mixture of nitrocellulose and polyvinyl butyral resin is the film-forming ingredient.

The chemical treatment of metal surfaces to render them resistant to corrosion and provide a suitable surface to which a protective coating will adhere has been the object of considerable investigation. Such chemical treatment is commonly accomplished by the use of wash primers which are organic coatings applied in very thin films, in the order of 0.3 mil, as a pretreatment conditioner for subsequent painting. In view of the thinness of the coating, it is quite important that the film produced is uniform and continuous. If a nonuniform and discontinuous film is produced due to contamination or lack of good film properties for any reason, the composition has little value or at best is inferior as a wash primer.

Three of the most difficult properties to obtain in organic coatings for metal are adequate adhesion, impact resistance, and prevention of under film corrosion of the metal. Numerous treatments and coatings have been developed in the past in an endeavor to obtain these desired properties. They include phosphoric acid treatment (e. g., "Bonderizing"), zinc chromate primers, red lead primers, and phenolic resin primers.

Wash primers, which represent both a metal treatment and an organic coating, are one of the most recent methods for improving metal coatings. The earliest wash primer, a two-package system, was called the WP-1 type. This system employed a dispersion of zinc chromate, polyvinyl butyral, and solvents in one package, and a phosphoric acid diluent in the other. This wash primer had poor can stability (about eight hours), was expensive, and its film was prone to blister under conditions of high humidity. An improved wash primer called the chromic-acid type was later developed. This primer consisted of an alcoholic solution of polyvinyl butyral reacted at elevated temperature with phosphoric and chromic acids. This later chromic acid wash primer has advantages over WP-1 primers in that can stability was improved (over one year) as well as resistance to humidity. The major disadvantages to the chromic acid wash primers now commercially available are the high cost of raw materials, the hazardous chemicals used in their manufacture, and their susceptibility to contamination which usually results in poor performance.

With these disadvantages in view, it is, therefore, a primary object of this invention to provide an improved corrosion inhibiting coating or wash primer of the chromic-acid type for metals including steel, aluminum, and the like wherein relatively low cost raw materials are utilized which are readily available and which may be reacted at room temperature with satisfactory results to produce a wash primer having good properties in respect to impact resistance, scratch adhesion of subsequent coatings and resistance to contamination, which properties additionally contribute to improving the corrosion resistance of the wash primer.

Other objects of the invention will appear hereinafter, the novel features and combination being set forth in the appended claim.

According to this invention, there is provided a coating composition, characterized by improved adhesion to metals and the ability to inhibit the corrosion of metals, comprising the reaction product of a solution of chromium trioxide, phosphoric acid, nitrocellulose, and polyvinyl butyral resin dissolved in organic solvent.

The following examples are illustrative of the invention wherein all parts given are parts by weight.

Example 1

A first solution was prepared by adding 4.6 parts of chromium trioxide to 9.3 parts of water. A second solution was prepared by adding 10.9 parts of 85% orthophosphoric acid to 98.6 parts of acetone. Still a third solution was prepared by adding 10.9 parts of Vinylite XYHL and 98.5 parts of SS nitrocellulose (¼ sec. dry) to 622.0 parts 3A ethyl alcohol. All solutions were prepared with continuous agitation. The first solution was then slowly added to the second solution with continued agitation. The mixture of the first solution and the second solution was then slowly added to the third solution with mild and continued agitation and the mixture thus formed was allowed to react for 40 minutes at room temperature. Then 145 parts of n-butanol was added to the reaction mixture and agitation was continued for approximately 15 minutes. The resulting composition had a dark green color, a solids content of 12%, a viscosity of 23 seconds (Ford No. 4 cup), and was transparent.

Example 2

The same solutions shown in Example 1 were used in the same proportions and mixed in the same way. However, the resin solution was heated to 50° C., then the solution of acids was added. The mixture was held at this temperature for 25 minutes after which is was cooled. When the temperature of the reaction mixture reached 35° C., 145 parts of n-butanol was added and the resulting composition was cooled to room temperature. This composition had a medium green color, a solids content of 12%, a viscosity of 21 seconds (Ford No. 4 cup), and was slightly turbid.

Compositions in accordance with this invention which were prepared as set forth in the foregoing examples were applied to metal panels. The panels tested were aluminum (3S) and cold rolled steel. The panels were first thoroughly cleaned in solvent, then one-half of each panel was dipped in the wash primer of this invention using a dip coater adjusted to provide a 0.3–0.5 mil dry film. One set of panels was topcoated the same day as dipping, another set of panels was topcoated after aging one week, and still another set of panels was topcoated after baking 15 minutes at 250° F. After the designated drying schedule, the entire panel was sprayed with three coats of nitrocellulose lacquer.

Impact resistance tests and scratch adhesion tests carried out on the various sets of panels showed generally an improvement in impact resistance and in scratch adhesion of the film applied over the wash primer of this invention in comparison with the film applied over the bare metal. Thus, in addition to the known corrosion resistance imparted by wash primers, wherein phosphoric acid and chromic acid have been disclosed as reacting with a metal surface to deposit a tightly adhering and insoluble layer of metal salt, there is provided an excellent film-forming constituent which is nitrocellulose bound in some manner to form a tightly adhering complex of the whole composition to metals. The complex chemical reactions which occur during the preparion of the compositions of this invention are not known. Additionally, the exact mechanism by which the compositions of this invention are bound to metals is not known. However, it has been observed physically that the nitrocellulose-polyvinyl butyral film or complex thereof is smooth, uniform, continuous and adhesive which is a highly important requisite for a corrosion inhibiting coating which also serves as a ground or base coat for painting.

It is evident that there are several factors which will influence conditions for the most satisfactory operation of this invention, the actual limits of which can be determined only by a detailed study of each set of materials to be utilized in preparing the compositions and the types of metals to which the compositions are to be applied. For example, the following factors will affect the suitability of the compositions of this invention for certain specific application: composition of solvent blend, water content, ratio of chromic acid to phosphoric acid and acid concentration, optimum reaction time and temperature, type and grade of nitrocellulose and polyvinyl butyral resin and type of metal to which the composition is to be applied.

Generally, however, it will be found that compositions prepared in proportions and using ingredients approximating those set forth in the examples will usually give satisfactory results for general application to certain metals.

In this respect, although SS nitrocellulose ¼ sec. is preferred as set forth in the examples, other protective coating type nitrocellulose having a viscosity from about 20 to about 10,000 cps. may be used within practical limits. Similarly, although Vinylite XYHL (vinyl content 54.4, butyraldehyde 38.3, acetate 0.3 and hydroxyl 7.0% with intrinsic viscosity of 0.81) polyvinyl butyral resin is preferred as set forth in the examples, other organosoluble vinyl butyral resins may be used within practical limits in combination with nitrocellulose for obtaining the reaction product and coating composition of this invention. Water is necessary as the solvent for chromium trioxide in order to avoid the spontaneous combustion which may occur when chromium trioxide is mixed directly with alcohol. Acetone is preferred for preparing the phosphoric acid solution, although other similar solvents may be used such as methyl ethyl ketone. The preferred solvent for the nitrocellulose-polyvinyl butyral mixture is 3A alcohol, although other solvents may be used such as 2B alcohol, mixtures of methanol and 2B or 3A alcohol, etc. The amount of chromium trioxide in the reaction mixture should be less than the amount of phosphoric acid present and, based on 1,000 parts by weight of the total reaction solution, the chromium trioxide, phosphoric acid, nitrocellulose and polyvinyl butyral may be varied within the following ranges: 0.5 to 5; 1 to 20; 10 to 200; and 10 to 200 parts, respectively. The concentration of the reaction product of this invention based on the total weight of the coating composition may be varied from about 3 to about 20% by weight. The primer of this invention is usually used without the addition of pigments, resins or diluents, but they can be added for particular uses. Generally, however, the coating composition will be used on metals without addition of these other materials since it is quite common practice to apply a protective coating over the primed metal base. Such protective coatings may be applied in the usual manner such as by dipping, spraying, and brushing. However, the primer coating composition of this invention may be applied using the above conventional methods of application and suitably dried at room or elevated temperature. Additionally, the compositions may be applied to a metal base by dipping or immersion with or without residence time and then suitably dried.

Certain uses for the coating compositions of this invention reflect its advantages in giving a smooth, uniform, continuous and adhesive film and include more particularly: automobile finishes in place of or supplementing Bonderizing (phosphoric acid treatment); pretreatment conditioner or pigmented primer for baking systems such as refrigerators or steel cabinets; pretreatment on castings or steel moldings where corrosion would be prevented during aging and undercoat provided; coating material for sheet steel to prevent corrosion in transit and storage and undercoat provided for any desired subsequent finishing; and coating material for aluminum foil to improve the adhesion of printing inks, and other aluminum objects such as venetian blinds, window frames, door frames, house siding, trailers, boats and airplanes where improved adhesion and corrosion resistance are desired.

What I claim and desire to protect by Letters Patent is:

A coating composition, characterized by improved adhesion to metals and the ability to inhibit the corrosion of metals, consisting essentially of the reaction product of a solution of 0.5 to 5 parts by weight of chromium trioxide, 1 to 20 parts by weight of phosphoric acid, 10 to 200 parts by weight of nitrocellulose, and 10 to 200 parts by weight of polyvinyl butyral resin dissolved in an organic solvent solution consisting of a mixture of lower aliphatic alcohols, ketones and water, said alcohols having from 1 to 4 carbon atoms, said ketones being solvents for phosphoric acid solution, the amount of said alcohols being sufficient to dissolve said nitrocellulose and polyvinyl butyral resin, the amount of said ketones being sufficient to dissolve said phosphoric acid solution, and the amount of water being sufficient to dissolve said chromium trioxide, said chromium trioxide being added to said solution in the form of an aqueous solution and in an amount less than the amount of said phosphoric acid, the concentration of said reaction product being from 3% to 20% by weight based on the total weight of said coating composition, and said coating composition being prepared at temperatures up to about 50° C.

References Cited in the file of this patent

UNITED STATES PATENTS

| | | |
|---|---|---|
| 1,254,263 | Oeschger | Jan. 22, 1918 |
| 1,514,494 | Williams | Nov. 4, 1924 |
| 2,293,558 | Overholt | Aug. 12, 1942 |
| 2,412,543 | Tanner | Dec. 10, 1946 |
| 2,469,318 | Swan | May 3, 1949 |
| 2,525,107 | Whiting et al. | Oct. 10, 1950 |